(12) United States Patent
Kim (10) Patent No.: US 9,667,186 B2
(45) Date of Patent: May 30, 2017

(54) ROTATION ANGLE ESTIMATION MODULE FOR SENSORLESS VECTOR CONTROL OF PMSM

(71) Applicant: LSIS CO., LTD., Anyang-si, Gyeonggi-do (KR)

(72) Inventor: Kwang Woon Kim, Gunpo-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/684,248

(22) Filed: Apr. 10, 2015

(65) Prior Publication Data

US 2015/0311847 A1 Oct. 29, 2015

(30) Foreign Application Priority Data

Apr. 29, 2014 (KR) .................. 10-2014-0051180

(51) Int. Cl.
 *H02P 21/14* (2016.01)
 *H02P 6/18* (2016.01)
 (Continued)

(52) U.S. Cl.
 CPC .............. *H02P 21/141* (2013.01); *H02P 6/18* (2013.01); *H02P 21/18* (2016.02); *H02P 2021/0071* (2013.01)

(58) Field of Classification Search
 CPC ........ H02P 21/146; H02P 6/18; H02P 21/141; H02P 2021/0071
 See application file for complete search history.

(56) References Cited

U.S. PATENT DOCUMENTS 4,885,520 A * 12/1989 Sugimoto ............. H02P 21/146
 318/805
6,137,258 A * 10/2000 Jansen .................... H02P 6/185
 318/802

(Continued)

FOREIGN PATENT DOCUMENTS

CN 103701386 4/2014
CN 103731082 4/2014
 (Continued)

OTHER PUBLICATIONS

European Patent Office Application Serial No. 15163779.0, Search Report dated Sep. 25, 2015, 4 pages.

(Continued)

*Primary Examiner* — Shawki S Ismail
*Assistant Examiner* — Muhammad S Islam
(74) *Attorney, Agent, or Firm* — Lee, Hong, Degerman, Kang & Waimey (57) ABSTRACT

A rotation angle estimation module is provided. The rotation angle estimation module includes: a fixed flux instruction estimation unit calculating a rotating flux ($\lambda_{sd}$, $\lambda_{sq}$) and a fixed flux instruction ($\lambda_{s\alpha}^*$, $\lambda_{s\beta}^*$) based on a rotation angle θ and the current ($I_{s\alpha}$, $I_{s\beta}$) of a fixed coordinate system; a fixed flux estimation unit calculating a fixed flux ($\lambda_{s\alpha}$, $\lambda_{s\beta}$) based on the voltage ($V_{s\alpha}$, $V_{s\beta}$) of the fixed coordinate system, and the current ($I_{s\alpha}$, $I_{s\beta}$) and fixed flux error ($\Delta_{s\alpha}$, $\Delta_{s\beta}$) of the fixed coordinate system; a fixed flux error estimation unit using the fixed flux instruction ($\lambda_{s\alpha}^*$, $\lambda_{s\beta}^*$) and the fixed flux ($\lambda_{s\alpha}$, $\lambda_{s\beta}$) to calculate the fixed flux error ($\Delta_{s\alpha}$, $\Delta_{s\beta}$) and feed the errors back to the fixed flux estimation unit; and a trigonometric function calculation unit calculating the rotation angle θ based on the rotating flux ($\lambda_{sd}$, $\lambda_{sq}$) and the fixed flux ($\lambda_{s\alpha}$, $\lambda_{s\beta}$).

10 Claims, 4 Drawing Sheets

(51) Int. Cl.
*H02P 21/18* (2016.01)
*H02P 21/00* (2016.01)

(56) References Cited

U.S. PATENT DOCUMENTS

| | | | | |
|---|---|---|---|---|
| 8,339,081 B2* | 12/2012 | Patel | ............... | H02P 6/185 |
| | | | | 318/400.02 |
| 8,344,671 B2* | 1/2013 | Tobari | ............... | H02P 6/085 |
| | | | | 318/400.02 |
| 2004/0257028 A1* | 12/2004 | Schulz | ............... | H02P 6/18 |
| | | | | 318/802 |
| 2006/0119305 A1* | 6/2006 | Lee | ............... | H02P 1/163 |
| | | | | 318/400.34 |
| 2008/0001571 A1* | 1/2008 | Tomigashi | ........ | H02P 21/0039 |
| | | | | 318/721 |
| 2009/0021195 A1* | 1/2009 | Tomigashi | ............... | H02P 6/14 |
| | | | | 318/400.02 |
| 2010/0109584 A1* | 5/2010 | Kwon | ............... | H02P 21/146 |
| | | | | 318/400.02 |
| 2010/0134064 A1* | 6/2010 | Heikkila | ............... | H02P 6/182 |
| | | | | 318/802 |
| 2011/0062902 A1* | 3/2011 | Patel | ............... | H02P 6/185 |
| | | | | 318/400.02 |
| 2011/0163704 A1* | 7/2011 | Wang | ............... | F04B 17/03 |
| | | | | 318/400.21 |
| 2011/0163709 A1* | 7/2011 | Dai | ............... | H02P 21/06 |
| | | | | 318/812 |
| 2012/0091941 A1* | 4/2012 | Hong | ............... | H02P 21/146 |
| | | | | 318/766 |
| 2013/0093370 A1 | 4/2013 | Yoo | | |
| 2013/0289934 A1 | 10/2013 | Bazzi et al. | | |

FOREIGN PATENT DOCUMENTS

| | | |
|---|---|---|
| EP | 2706659 | 3/2014 |
| JP | H0870598 A | 3/1996 |
| JP | 2004166408 A | 6/2004 |
| JP | 2005-261138 | 9/2005 |
| JP | 2011250630 A | 12/2011 |
| JP | 2013-523065 | 6/2013 |
| JP | 2014-057512 | 3/2014 |
| KR | 10-0299457 | 4/2002 |
| KR | 10-0484818 | 4/2005 |
| KR | 10-2013-0106505 | 9/2013 |
| WO | 2010/055168 | 5/2010 |

OTHER PUBLICATIONS

Japan Patent Office of Japanese Patent Application No. 2015-087317, Office Action dated Mar. 1, 2016, 2 pages.
Japan Patent Office of Japanese Patent Application No. 2015-087317, Notice of Allowance dated Sep. 13, 2016, 3 pages.

* cited by examiner

ROTATION ANGLE ESTIMATION MODULE FOR SENSORLESS VECTOR CONTROL OF PMSM

CROSS-REFERENCE TO RELATED APPLICATIONS

Pursuant to 35 U.S.C. §119(a), this application claims the benefit of earlier filing date and right of priority to Korean Patent Application No. 10-2014-0051180 filed on Apr. 29, 2014, the contents of which are all hereby incorporated by reference herein in its entirety.

BACKGROUND

The present disclosure relates to a sensorless vector control system of a permanent magnet synchronous motor (PMSM), and more particularly, to a rotation angle estimation module for sensorless vector control of a PMSM.

In general, information on the speed and location of a rotor is needed to control drive and control a synchronous motor, and a separate location sensor, such as an encoder or resolver is used for detecting the location.

However, since a method of detecting the speed and location by using a sensor has limitations in the complexity of hardware, an expensive cost, low reliability, and electrical noise, it is insufficient in economy and technology.

Since various sensorless vector control methods have been proposed in order to solve such limitations, a sensor less control method may estimate information on the speed and location of the rotor without installing a separate location sensor.

Typical sensorless vector control methods of a PMSM include a method of using counter electromotive force, a method of using a voltage model, a method of using a model reference controller, a method of using a status estimation module, a Kalman filter, non-linear control, and intellectual control, but since they need a significant amount of calculation and an estimation error occurs in a low-speed region, there was a limitation in that they are not easy to actually use.

Thus, there is a sensorless vector control method of a PMSM that may drastically decrease the amount of calculation and minimize the estimation error.

SUMMARY

Embodiments provide a rotation angle estimation module and a sensorless vector control system of a permanent magnet synchronous motor (PMSM) employing the module that decrease an amount of calculation for the rotation angle estimation of the PMSM and minimize an estimation error, in the sensorless vector control of the PMSM.

In one embodiment, a rotation angle estimation module of a permanent magnetic synchronous motor (PMSM) for sensorless vector control of the PMSM includes: a fixed flux instruction estimation unit calculating a rotating flux ($\lambda_{sd}$, $\lambda_{sq}$) and a fixed flux instruction ($\lambda_{s\alpha}^*$, $\lambda_{s\beta}^*$) based on a rotation angle $\theta$ and the current ($I_{s\alpha}$, $I_{s\beta}$) of a fixed coordinate system; a fixed flux estimation unit calculating a fixed flux ($\lambda_{s\alpha}$, $\lambda_{s\beta}$) based on the voltage ($V_{s\alpha}$, $V_{s\beta}$) of the fixed coordinate system, and the current ($I_{s\alpha}$, $I_{s\beta}$) and fixed flux error ($\Delta_{s\alpha}$, $\Delta_{s\beta}$) of the fixed coordinate system; a fixed flux error estimation unit using the difference between the fixed flux instruction ($\lambda_{s\alpha}^*$, $\lambda_{s\beta}^*$) and the fixed flux ($\lambda_{s\alpha}$, $\lambda_{s\beta}$) to calculate the fixed flux error ($\Delta_{s\alpha}$, $\Delta_{s\beta}$) and feed the errors back to the fixed flux estimation unit; and a trigonometric function calculation unit calculating the rotation angle $\theta$, a distance that a rotor moves, based on the rotating flux ($\lambda_{sd}$, $\lambda_{sq}$) and the fixed flux ($\lambda_{s\alpha}$, $\lambda_{s\beta}$).

The trigonometric function calculation unit may finally calculate the rotation angle $\theta$ and feeds a calculated angle back to the fixed flux instruction estimation unit.

The fixed flux instruction estimation unit may calculate the rotating flux ($\lambda_{sd}$, $\lambda_{sq}$) based on the current ($I_{s\alpha}$, $I_{s\beta}$) of the fixed coordinate system, the rotation angle $\theta$, the inductance ($L_d$, $L_q$) of a rotary coordinate system, and the flux $\lambda_{PM}$ of a permanent magnet.

The fixed flux instruction estimation unit may compensate for the rotation angle $\theta$ by using the rotating flux ($\lambda_{sd}$, $\lambda_{sq}$) to calculate a fixed flux instruction ($\lambda_{s\alpha}^*$, $\lambda_{s\beta}^*$).

The fixed flux estimation unit may receive the $\alpha$ axis voltage $V_{s\alpha}$ of the fixed coordinate system, the $\alpha$ axis current $I_{s\alpha}$ of the fixed coordinate system, and the $\alpha$ axis flux error $\Delta_{s\alpha}$ of the fixed coordinate system to calculate an $\alpha$ axis flux change ratio $d\lambda_{s\alpha}/dt$ of the fixed coordinate system by using an equation $d\lambda_{s\alpha}/dt=V_{s\alpha}-R_sI_{s\alpha}+\Delta_{s\alpha}$ ($R_s$: stator resistance), receive the $\beta$ axis voltage $V_{s\beta}$ of the fixed coordinate system, the $\beta$ axis current $I_{s\beta}$ of the fixed coordinate system, and the $\beta$ axis flux error $\Delta_{s\beta}$ of the fixed coordinate system to calculate the $\beta$ axis flux change ratio $d\lambda_{s\beta}/dt$ of the fixed coordinate system by using the equation $d\lambda_{s\beta}/dt=V_{s\beta}-R_sI_{s\beta}+\Delta_{s\beta}$ ($R_s$: stator resistance), integrate the $\alpha$ axis flux change ratio $d\lambda_{s\alpha}/dt$ of the fixed coordinate system to output the $\alpha$ axis flux $\lambda_{s\alpha}$, and integrate the output of the $\beta$ axis flux change ratio $d\lambda_{s\beta}/dt$ of the fixed coordinate system to output the $\beta$ axis flux $\lambda_{s\beta}$ of the fixed coordinate system.

The fixed flux error estimation unit may calculate the difference between the $\alpha$ axis flux instruction value $\lambda_{s\alpha}^*$ of the fixed coordinate system input from the fixed flux instruction estimation unit and the $\alpha$ axis flux $\lambda_{s\alpha}$ input from the fixed flux estimation unit, calculate the difference between the $\beta$ axis flux instruction value $\lambda_{s\beta}^*$ of the fixed coordinate system input from the fixed flux instruction estimation unit and the $\beta$ axis flux $\lambda_{s\beta}$ input from the fixed flux estimation unit, receive the difference from the $\alpha$ axis flux $\lambda_{s\alpha}$ to adjust a gain and calculate the $\alpha$ axis flux error $\Delta_{s\alpha}$ of the fixed coordinate system, and receive the difference from the $\beta$ axis flux $\lambda_{s\beta}$ to adjust a gain and calculate the $\beta$ axis flux error $\Delta_{s\beta}$ of the fixed coordinate system.

The trigonometric function calculation unit 40 may find angles $\theta_{dq}$ and $\theta_{\alpha\beta}$ by the applying of a trigonometric function to the rotating flux ($\lambda_{sd}$, $\lambda_{sq}$) and the fixed flux ($\lambda_{s\alpha}$, $\lambda_{s\beta}$), respectively, and output the rotation angle $\theta$ based on the angles $\theta_{dq}$ and $\theta_{\alpha\beta}$.

The trigonometric function calculation unit 40 may receive the d axis flux $\lambda_{sd}$ of the rotary coordinate system and the q axis flux $\lambda_{sq}$ of the rotary coordinate system from the fixed flux instruction estimation unit to output the angle $\theta_{dq}$ of $\lambda_{d\,q}$ based on the d axis by using a trigonometric function arctangent, receive the $\alpha$ axis flux $\lambda_{s\alpha}$ of the fixed coordinate system and the $\beta$ axis flux $\lambda_{s\beta}$ of the fixed coordinate system from the fixed flux estimation unit to output the angle $\theta_{\alpha\beta}$ of $\lambda_{\alpha\beta}$ based on the $\alpha$ axis by using the trigonometric function arctangent, and find the difference between the angles $\theta_{dq}$ and $\theta_{\alpha\beta}$ to output the rotation angle $\theta$.

In another embodiment, an operating method of a rotation angle estimation module of a motor for sensorless vector control of a PMSM includes: calculating a rotating flux ($\lambda_{sd}$, $\lambda_{sq}$) and a fixed flux instruction ($\lambda_{s\alpha}^*$, $\lambda_{s\beta}^*$) based on the current ($I_{s\alpha}$, $I_{s\beta}$) of a fixed coordinate system and a rotation angle $\theta$; calculating a fixed flux ($\lambda_{s\alpha}$, $\lambda_{s\beta}$) based on the voltage ($V_{s\alpha}$, $V_{s\beta}$) of the fixed coordinate system, and the current ($I_{s\alpha}$, $I_{s\beta}$) and fixed flux error ($\Delta_{s\alpha}$, $\Delta_{s\beta}$) of the fixed coordinate system, through a fixed flux estimation unit; using the difference between the fixed flux instruction ($\lambda_{s\alpha}^*$, $\lambda_{s\beta}^*$) and the fixed flux ($\lambda_{s\alpha}$, $_{s\beta}$) to calculate the fixed flux error ($\Delta_{s\alpha}$, $\Delta_{s\beta}$) and feed the errors back to the fixed flux estimation unit; and calculating the rotation angle θ, a distance that a rotor moves, based on the rotating flux ($\lambda_{sd}$, $\lambda_{sq}$) and the fixed flux ($\lambda_{s\alpha}$, $\lambda_{s\beta}$).

The details of one or more embodiments are set forth in the accompanying drawings and the description below. Other features will be apparent from the description and drawings, and from the claims.

DETAILED DESCRIPTION OF THE EMBODIMENTS

In the following, the technical features of an embodiment are described in detail with reference to the accompanying drawings.

Figure 1:
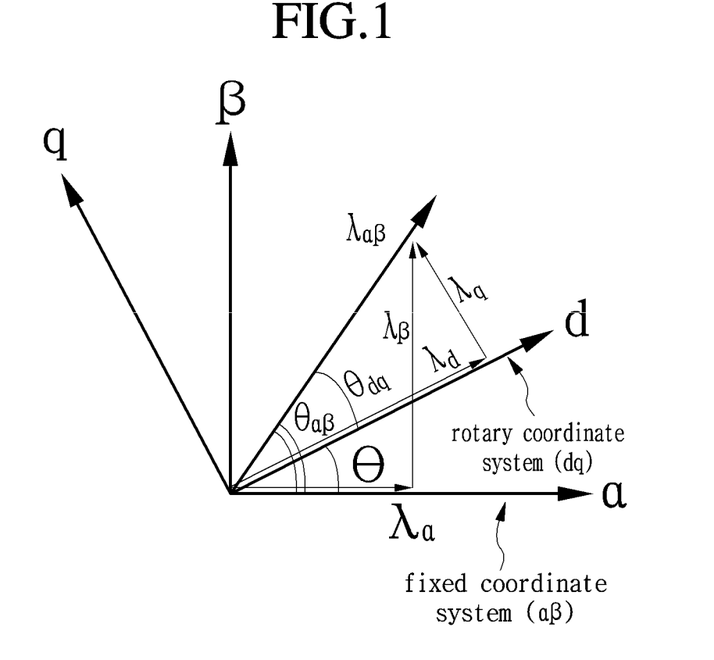
FIG. 1 is a diagram for explaining vector between the fixed coordinate system and rotary coordinate system of the rotation angle estimation module according to an embodiment.

FIG. 1 shows the principle of the sensorless vector control method of a permanent magnet synchronous motor (PMSM) according to an embodiment, by using a vector diagram.

The vector control method divides and controls currents applied to the motor into a flux current $Id_{se}$ and a torque current $Iq_{se}$ based on a rotary coordinate system.

The vector control method of the PMSM fixes the flux current $Id_{se}$ to match a rotor location θ, and applies the torque current $Iq_{se}$ to the sensorless vector control of the PMSM.

In order to match the flux current $Id_{se}$ with the rotor location θ, there is a need to acquire the rotor location θ from a location sensor.

FIG. 1 represents a flux relationship according to a fixed coordinate system αβ and a rotary coordinate system dq in the vector control of the PMSM, an axis used for a vector control system is divided into the fixed coordinate system and the rotary coordinate system, the fixed coordinate system indicates a coordinate system having a coordinate axis not rotating but fixed, and the rotary coordinate system indicates a coordinate system that rotates at any angular velocity ω.

By using a flux value ($\lambda_\alpha$, $\lambda_\beta$) based on the fixed coordinate system αβ and a flux value ($\lambda_d$, $\lambda_q$) based on the rotary coordinate system dq, it is possible to estimate the rotor location θ by subtracting the angle $\theta_{dq}$ of $\lambda_{dq}$ based on the d axis from the angle $\theta_{\alpha\beta}$ of $\lambda_{\alpha\beta}$ based on the α axis.

An embodiment estimates a final rotor location by using stator flux vector $\lambda_{\alpha\beta}$ based on the fixed coordinate system αβ and rotor flux vector $\lambda_{dq}$ based on the rotary coordinate system dq along with arctangent $\tan^{-1}$ and information on the estimated rotor location matches the location of an actual motor.

Figure 2:
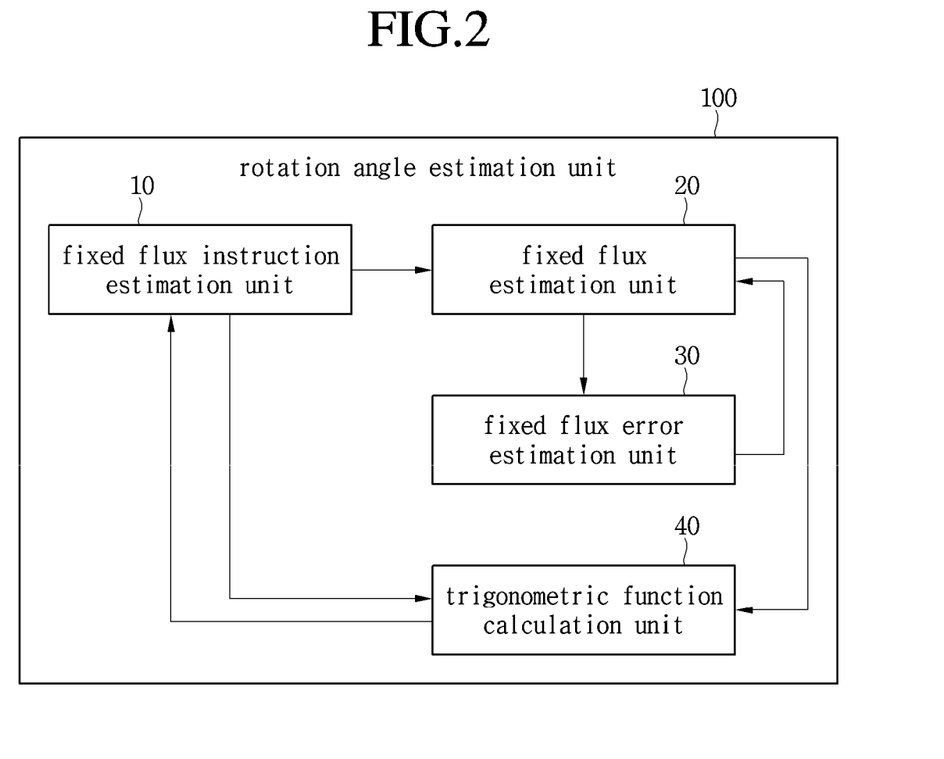
FIG. 2 is a block diagram representing the general relationships between the components of the rotation angle estimation module according to an embodiment.

FIG. 2 shows a rotation angle estimation unit 100 estimating a rotation angle θ, a distance that a rotor moves, based on the vector diagram of FIG. 1 and the rotation angle estimation unit 100 includes a fixed flux instruction estimation unit 10, a fixed flux estimation unit 20, a fixed flux error estimation unit 30, and a trigonometric function calculation unit 40.

The fixed flux instruction estimation unit 10 calculates a rotating flux ($\lambda_{sd}$, $\lambda_{sq}$) and a fixed flux instruction ($\lambda_{s\alpha}^*$, $\lambda_{s\beta}^*$) based on the current ($I_{s\alpha}$, $I_{s\beta}$) and the rotation angle θ based on the fixed coordinate system αβ. In particular, the fixed flux instruction estimation unit 10 receives the current ($I_{s\alpha}$, $I_{s\beta}$) and rotation angle θ of the fixed coordinate system αβ and uses a rotor flux equation to calculate the fixed flux instruction ($\lambda_{s\alpha}^*$, $\lambda_{s\beta}^*$).

The rotor flux equation firstly calculates a rotating flux ($\lambda_{sd}$, $\lambda_{sq}$) and finally calculates the fixed flux instruction ($\lambda_{s\alpha}^*$, $\lambda_{s\beta}^*$) by using a calculation result.

The fixed flux estimation unit 20 calculates the fixed flux ($\lambda_{s\alpha}$, $\lambda_{s\beta}$) based on the voltage ($V_{s\alpha}$, $V_{s\beta}$) of the fixed coordinate system αβ, and the current ($I_{s\alpha}$, $I_{s\beta}$) and fixed flux error ($\Delta_{s\alpha}$, $\Delta_{s\beta}$) of the fixed coordinate system. In particular, the fixed flux estimation unit 20 receives the voltage ($V_{s\alpha}$, $V_{s\beta}$) of the fixed coordinate system αβ, and the current ($I_{s\alpha}$, $I_{s\beta}$) and fixed flux error ($\Delta_{s\alpha}$, $\Delta_{s\beta}$) of the fixed coordinate system αβ and uses a stator voltage equation to calculate the fixed flux ($\lambda_{s\alpha}$, $\lambda_{s\beta}$) of the α and β axes.

The fixed flux error estimation unit 30 uses the difference between the fixed flux instruction ($\lambda_{s\alpha}^*$, $\lambda_{s\beta}^*$) and the fixed flux ($\lambda_{s\alpha}$, $\lambda_{s\beta}$) to calculate the fixed flux error ($\Delta_{s\alpha}$, $\Delta_{s\beta}$) and feeds the errors back to the fixed flux estimation unit. In particular, the fixed flux error estimation unit 30 uses the difference between the fixed flux instruction ($\lambda_{s\alpha}^*$, $\lambda_{s\beta}^*$) output by the fixed flux instruction estimation unit 10 and the fixed flux ($\lambda_{s\alpha}$, $\lambda_{s\beta}$) output by the fixed flux estimation unit 20 to calculate the fixed flux error ($\Delta_{s\alpha}$, $\Delta_{s\beta}$) of the α and β axes and feeds the errors back to the fixed flux estimation unit 20.

The trigonometric function calculation unit 40 calculates the rotation angle θ, a distance that a rotor moves, based on the rotating flux ($\lambda_{sd}$, $\lambda_{sq}$) and the fixed flux ($\lambda_{s\alpha}$, $\lambda_{s\beta}$). In particular, the trigonometric function calculation unit 40 performs calculation on the rotating flux ($\lambda_{sd}$, $\lambda_{sq}$) firstly calculated by the rotor flux equation of the fixed flux instruction estimation unit 10 and the fixed flux ($\lambda_{s\alpha}$, $\lambda_{s\beta}$) output by the fixed flux estimation unit 20 by using trigonometric functions to find angles $\theta_{dq}$ and $\theta_{\alpha\beta}$, respectively.

When the angle $\theta_{dq}$ is finally subtracted from the angle $\theta_{\alpha\beta}$, it is possible to calculate the rotation angle θ, a distance that a rotor moves, and a calculated rotation angle is fed back to the fixed flux instruction estimation unit 10.

The rotation angle estimation unit 100 continues to calculate the rotation angle θ by feedback between the fixed flux error estimation unit 30 and the fixed flux estimation unit 20, between the fixed flux estimation unit 20 and the trigonometric function calculation unit 40, and between the fixed flux instruction estimation unit 10 and the trigonometric function calculation unit 40.

Figure 3:
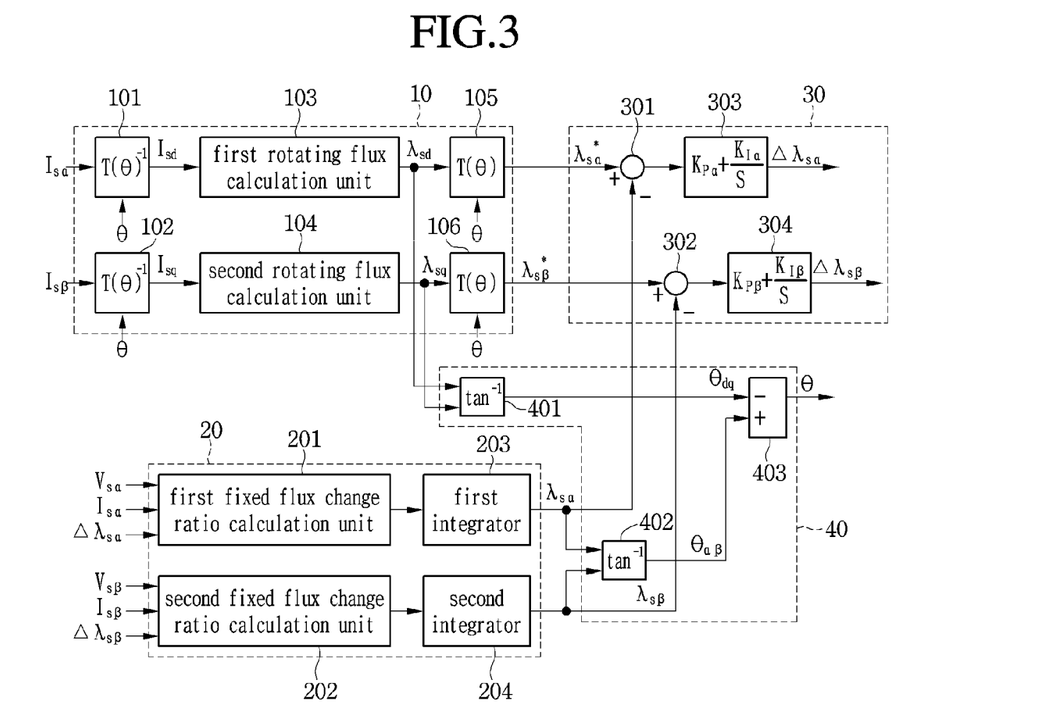
FIG. 3 is a block diagram based on a circuit diagram of the rotation angle estimation module according to an embodiment.

Each component of the rotation angle estimation unit is described in detail by using FIG. 3 that is a block diagram representing a particular circuit configuration of the rotation angle estimation unit 100.

<Fixed Flux Instruction Estimation Unit 10>

The fixed flux instruction estimation unit 10 includes a first rotary coordinate conversion unit 101, a second rotary coordinate conversion unit 102, a first rotating flux calculation unit 103, a second rotating flux calculation unit 104, a first fixed coordinate conversion unit 105, and a second fixed coordinate conversion unit 106.

The first rotary coordinate conversion unit 101 receives the α axis current $I_{s\alpha}$ of the fixed coordinate system and the rotation angle θ in order to use a rotor flux equation and coordinate-converts into the d axis current value $I_{sd}$ of the rotary coordinate system.

The second rotary coordinate conversion unit 102 receives the β axis current $I_{s\beta}$ of the fixed coordinate system and the rotation angle θ and coordinate-converts into the q axis current value $I_{sq}$ of the rotary coordinate system.

The first rotating flux calculation unit 103 receives the d axis current $I_{sd}$ of the first rotary coordinate conversion unit 101 and uses the rotor flux equation, $\lambda_{sd}=L_d I_{sd}+\lambda_{PM}$ ($L_d$: d axis inductance of the rotary coordinate system, $\lambda_{PM}$: flux by a permanent magnet) to calculate the d axis flux $\lambda_{sd}$ of the rotary coordinate system.

The second rotating flux calculation unit 104 receives the q axis current $I_{sq}$ of the second rotary coordinate conversion unit 102 and uses the rotor flux equation, $\lambda_{sq}=L_q I_{sq}$ ($L_q$: q axis inductance of the rotary coordinate system) to calculate the q axis flux $\lambda_{sq}$ of the rotary coordinate system.

The d axis flux $\lambda_{sd}$ and q axis flux $\lambda_{sq}$ of the rotary coordinate system are input to the trigonometric function calculation unit 40.

The first fixed coordinate conversion unit 105 is a compensator compensating for a value coordinate-converted in order to use the rotor flux equation, compensates for the rotation angle θ by using the output of the first rotating flux calculation unit 103 to coordinate-convert into the fixed coordinate system, and outputs the α axis flux instruction value $\lambda_{s\alpha}*$ of the fixed coordinate system.

The second fixed coordinate conversion unit 106 compensates for the rotation angle θ by using the output of the second rotating flux calculation unit 104 to coordinate-convert into the fixed coordinate system, and outputs the β axis flux instruction value $\lambda_{s\beta}*$ of the fixed coordinate system.

<Fixed Flux Estimation Unit 20>

The fixed flux estimation unit 20 includes a first fixed flux change ratio calculation unit 201, a second fixed flux change ratio calculation unit 202, a first integrator 203, and a second integrator 204.

The first fixed flux change ratio calculation unit 201 receives the α axis voltage $V_{s\alpha}$ of the fixed coordinate system, the α axis current $I_{s\alpha}$ of the fixed coordinate system, and the α axis flux error $\Delta_{s\alpha}$ of the fixed coordinate system, term-converts the stator voltage equation, $V_{s\alpha}=R_s I_{s\alpha}+d\lambda_{s\alpha}/dt$ ($R_s$: stator resistance) into the equation $d\lambda_{s\alpha}/dt=V_{s\alpha}-R_s I_{s\alpha}+\Delta_{s\alpha}$ ($R_s$: stator resistance), and calculates the α axis flux change ratio $d\lambda_{s\alpha}/dt$ of the fixed coordinate system.

The second fixed flux change ratio calculation unit 202 receives the β axis voltage $V_{s\beta}$ of the fixed coordinate system, the β axis current $I_{s\beta}$ of the fixed coordinate system, and the β axis flux error $\Delta_{s\beta}$ of the fixed coordinate system, term-converts the stator voltage equation, $V_{s\beta}=R_s I_{s\beta}+d\lambda_{s\beta}/dt$ ($R_s$: stator resistance) into the equation $d\lambda_{s\beta}/dt=V_{s\beta}-R_s I_{s\beta}+\Delta_{s\beta}$ ($R_s$: stator resistance), and calculates the β axis flux change ratio $d\lambda_{s\beta}/dt$ of the fixed coordinate system.

The first integrator 203 integrates the outputs of the first fixed flux change ratio calculation unit 201 to output the α axis flux $\lambda_{s\alpha}$ of the fixed coordinate system.

The second integrator 204 integrates the outputs of the second fixed flux change ratio calculation unit 202 to output the β axis flux $\lambda_{s\beta}$ of the fixed coordinate system.

The α axis flux $\lambda_{s\alpha}$ and β axis flux $\lambda_{s\beta}$ output by the first integrator 203 and the second integrator 204 are input to the trigonometric function calculation unit 40.

<Fixed Flux Error Estimation Unit 30>

The fixed flux error estimation unit 30 includes a first subtractor 301, a second subtractor 302, a first controller 303 and a second controller 304 and performs the function of compensating for the estimated fixed coordinate system α-β axis flux, and an error is compensated for by a PI controller and input to the fixed flux estimation unit 20.

The first subtractor 301 calculates the difference between the α axis flux instruction value $\lambda_{s\alpha}*$ of the fixed coordinate system input from the fixed flux instruction estimation unit 10 and the α axis flux $\lambda_{s\alpha}$ input from the fixed flux estimation unit 20.

The second subtractor 302 calculates the difference between the β axis flux instruction value $\lambda_{s\beta}*$ of the fixed coordinate system input from the fixed flux instruction estimation unit 10 and the β axis flux $\lambda_{s\beta}$ input from the fixed flux estimation unit 20.

The first controller 303 receives the difference from the first subtractor 301, performs proportional-integral (PI) control by the equation $K_{P\alpha}+K_{I\alpha}/S$ ($K_{P\alpha}$: proportional gain, $K_{I\alpha}$: integral gain, S: complex variable) to adjust a gain and calculates the α axis flux error $\Delta_{s\alpha}$ of the fixed coordinate system.

The second controller 304 receives the difference from the second subtractor 302, performs PI control by the equation $K_{P\beta}+K_{I\beta}/S$ ($K_{P\beta}$: proportional gain, $K_{I\beta}$: integral gain, S: complex variable) to adjust a gain and calculates the β axis flux error $\Delta_{s\beta}$ of the fixed coordinate system.

The α axis flux error $\Delta_{s\alpha}$ and β axis flux error $\Delta_{s\beta}$ are fed back to the fixed flux estimation unit 20.

<Trigonometric Function Calculation Unit 40>

The trigonometric function calculation unit 40 includes a first arctangent unit 401, a second arctangent unit 402, and a rotation angle subtraction unit 403.

The first arctangent unit 401 receives the d axis flux $\lambda_{sd}$ of the rotary coordinate system and the q axis flux $\lambda_{sq}$ of the rotary coordinate system from the fixed flux instruction estimation unit 10 and outputs the angle $\theta_{dq}$ of $\lambda_{dq}$ based on the d axis by using a trigonometric function arctangent.

The second arctangent unit 402 receives the α axis flux $\lambda_{s\alpha}$ of the fixed coordinate system and the β axis flux $\lambda_{s\beta}$ of the fixed coordinate system from the fixed flux estimation unit 20 and outputs the angle $\theta_{\alpha\beta}$ of $\lambda_{\alpha\beta}$ based on the α axis by using the trigonometric function arctangent.

The rotation angle subtraction unit 403 finds the difference between the angles $\theta_{\alpha\beta}$ and $\theta_{dq}$ to output the rotation angle θ, and the rotation angle θ is fed back to the fixed flux instruction estimation unit 10.

When the rotation angle θ is found, it is possible to find the speed $W_e$ of a rotor and thus the sensorless vector control system of the PMSM according to an embodiment receives the rotation angle θ and the speed $W_e$ from the rotation angle estimation unit 100 and controls the PMSM.

Figure 4:
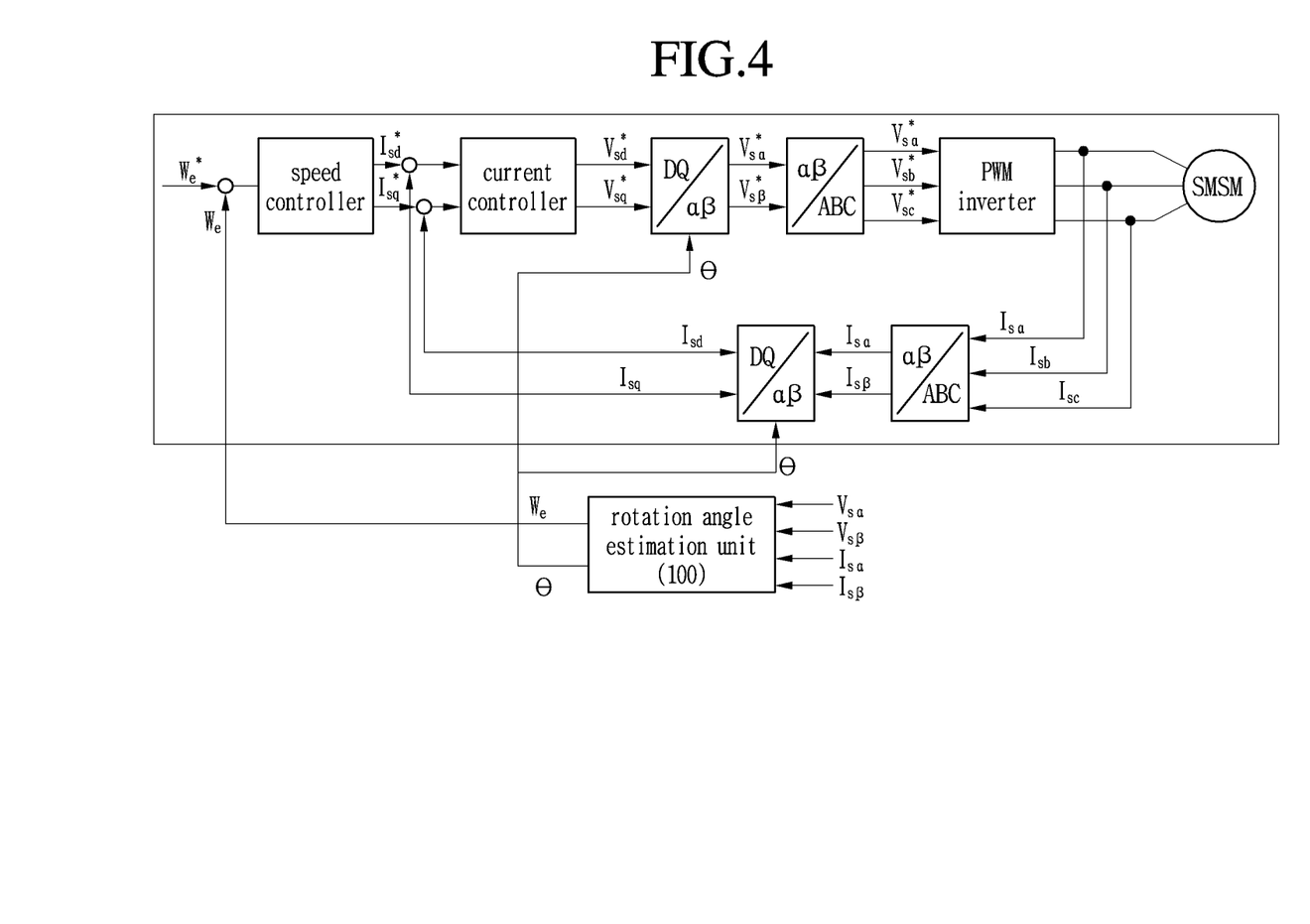
FIG. 4 is a block diagram representing a status in which the rotation angle estimation module according to an embodiment is applied to a typical sensorless vector control system of a permanent magnet synchronous motor (PMSM).

FIG. 4 is a block diagram representing a state in which the rotation angle estimation unit 100 according to an embodiment is applied to a sensorless vector control system inverter-controlling a typical PMSM, through which it is possible to understand how the outputs of the rotation angle estimation unit 100, the rotation angle θ and the speed $W_e$ are input to a PMSM control unit 1.

The technical scope of an embodiment includes the sensorless vector control system of the PMSM to which the rotation angle estimation unit 100 is applied.

Since the embodiment describes a method of finding the stator flux vector and the rotor flux vector, the flux equation of a rotor circuit is coordinate-converted into the stator flux equation by the applying of the voltage equation of a stator circuit and the flux equation of the rotor circuit and then the stator flux vector is compensated for to finally find the stator flux vector and the rotor flux vector.

The angles $\theta_{\alpha\beta}$ and $\theta_{dq}$ are found by the applying of the trigonometric function $\tan^{-1}$ to the final stator flux vector and rotor flux vector and the location $\theta$ information on the PMSM is estimated by using the equation $\theta=\theta_{\alpha\beta}-\theta_{dq}$.

Since the method is easy to implement, it is easy to actually apply it to a product and since the stator voltage equation and the rotor equation are together used, an estimated error in location information at low and high speeds is minimized.

Also, the rotation angle estimation unit 100 according to an embodiment may also be applied to a vector control system having location and speed sensors as a backup in addition to the sensorless vector control system of the PMSM.

According to an embodiment, since the stator voltage equation and the rotor equation are together used, it is possible to rapidly and accurately estimate the rotation angle of a rotor at low and high speeds and by applying the estimated rotation angle to perform the sensorless vector control of the PMSM, it is possible to provide a more reliable and economical sensorless vector control system of the PMSM.

Although embodiments have been described with reference to a number of illustrative embodiments thereof, it should be understood that numerous other modifications and embodiments can be devised by those skilled in the art that will fall within scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vector control system for sensorless vector control of a motor, the system comprising:
   a rotation angle estimation module;
   a permanent magnetic synchronous motor (PMSM); and
   a permanent magnetic synchronous motor control unit receiving a rotation angle and speed of a rotor of a fixed coordinate system and controlling the PMSM based on the rotation angle and speed,
   wherein the rotation angle estimation module comprises:
   a fixed flux instruction estimation unit calculating a rotating flux and a fixed flux instruction based on the rotation angle and a current of the fixed coordinate system;
   a fixed flux estimation unit calculating a fixed flux based on a voltage, the current and a fixed flux error of the fixed coordinate system;
   a fixed flux error estimation unit calculating the fixed flux error using a difference between the calculated fixed flux instruction and the calculated fixed flux and feeding the calculated fixed flux error back to the fixed flux estimation unit; and
   a trigonometric function calculation unit calculating the rotation angle based on the calculated rotating flux and the calculated fixed flux and feeding the calculated rotation angle back to the fixed flux instruction estimation unit,
   wherein the rotation angle is a distance that the rotor moves, and
   wherein calculating the rotation angle comprises:
   applying a trigonometric function to the calculated rotating flux to determine a first angle;
   applying the trigonometric function to the calculated fixed flux to determine a second angle;
   receiving a d-axis flux of a rotary coordinate system and a q-axis flux of the rotary coordinate system from the fixed flux instruction estimation unit;
   using a trigonometric function arctangent to output the first angle based on the d-axis flux;
   receiving a $\alpha$-axis flux of the fixed coordinate system and a $\beta$-axis flux of the fixed coordinate system from the fixed flux estimation unit;
   using the trigonometric function arctangent to output the second angle based on the $\alpha$-axis flux;
   determining a difference between the first angle and second angle; and
   outputting the rotation angle.

2. The system of claim 1, wherein the fixed flux instruction estimation unit calculates the rotating flux based on the current of the fixed coordinate system, the rotation angle of the fixed coordinate system, an inductance of the rotary coordinate system, and a flux of a permanent magnet.

3. The system of claim 1, wherein calculating the fixed flux comprises:
   receiving a stator resistance $R_s$;
   receives a $\alpha$-axis voltage $V_{s\alpha}$ of the fixed coordinate system, a $\alpha$-axis current $I_{s\alpha}$ of the fixed coordinate system, and a $\alpha$-axis flux error $\Delta_{s\alpha}$ of the fixed coordinate system;
   calculating a $\alpha$-axis flux change ratio $d\lambda_{s\alpha}/dt$ of the fixed coordinate system according to an equation $d\lambda_{s\alpha}/dt=V_{s\alpha}-R_sI_{s\alpha}+\Delta_{s\alpha}$;
   receiving a $\beta$-axis voltage $V_{s\beta}$ of the fixed coordinate system, a $\beta$-axis current $I_{s\beta}$ of the fixed coordinate system, and the $\beta$-axis flux error $\Delta_{s\beta}$ of the fixed coordinate system;
   calculating a $\beta$-axis flux change ratio $d\lambda_{s\beta}/dt$ of the fixed coordinate system according to and equation $d\lambda_{s\beta}/dt=V_{s\beta}-R_sI_{s\beta}+\Delta_{s\beta}$;
   integrating the calculated $\alpha$-axis flux change ratio to output a $\alpha$-axis flux $\lambda_{s\alpha}$ of the fixed coordinate system; and
   integrating the calculated $\beta$-axis flux change ratio to output the $\beta$-axis flux $\lambda_{s\beta}$ of the fixed coordinate system.

4. The system of claim 1, wherein calculating the fixed flux error comprises:
   receiving a $\alpha$-axis flux instruction value of the fixed coordinate system and $\alpha$-axis flux from the fixed flux estimation unit;
   receiving a $\beta$-axis flux instruction value of the fixed coordinate system and a $\beta$-axis flux from the fixed flux estimation unit;
   calculating a first difference between the received $\alpha$-axis flux instruction value and the received $\alpha$-axis flux;
   calculating a second difference between the received $\beta$-axis flux instruction value and the received $\beta$-axis flux;

using the first difference to adjust a gain and calculate a α-axis flux error of the fixed coordinate system; and
using the second difference to adjust a gain and calculate a β-axis flux error of the fixed coordinate system.

5. The system of claim 2, wherein the fixed flux instruction estimation unit calculates the fixed flux instruction by using the calculated rotating flux to compensate for the rotation angle of the fixed coordinate system.

6. A operating method for sensorless vector control of a permanent magnetic synchronous motor (PMSM) in a sensorless vector control system, the method comprising:
receiving a rotation angle and speed of a rotor of a fixed coordinate system;
calculating a rotating flux and a fixed flux instruction based on the rotation angle and a current of the fixed coordinate system;
calculating a fixed flux based on a voltage, the current and a fixed flux error of the fixed coordinate system;
calculating the fixed flux error using a difference between the calculated fixed flux instruction and the calculated fixed flux and feeding the calculated fixed flux error back for calculating the fixed flux;
calculating the rotation angle based on the calculated rotating flux and the calculated fixed flux and feeding the calculated rotation angle back for calculating the rotating flux;
controlling PMSM based on the rotation angle and speed, wherein the rotation angle is a distance that the rotor moves, and
wherein calculating the rotation angle comprises:
applying a trigonometric function to the calculated rotating flux to determine a first angle;
applying the trigonometric function to the calculated fixed flux to determine a second angle;
receiving a d-axis flux of a rotary coordinate system and a q-axis flux of the rotary coordinate system;
using a trigonometric function arctangent to output the first angle based on the d-axis flux;
receiving a α-axis flux of the fixed coordinate system and a β-axis flux of the fixed coordinate system;
using the trigonometric function arctangent to output the second angle based on the α-axis flux;
determining a difference between the first angle and second angle; and
outputting the rotation angle.

7. The method according to claim 6, wherein the rotating flux is calculated based on the current of the fixed coordinate system, the rotation angle of the fixed coordinate system, an inductance of the rotary coordinate system, and a flux of a permanent magnet.

8. The method according to claim 6, wherein calculating the fixed flux comprises:
receiving a stator resistance $R_s$;
receiving the α-axis voltage $V_{s\alpha}$ of the fixed coordinate system, the α-axis current $I_{s\alpha}$ of the fixed coordinate system, and a α axis flux error $\Delta_{s\alpha}$ of the fixed coordinate system;
calculating a α-axis flux change ratio $d\lambda_{s\alpha}/dt$ of the fixed coordinate system according to an equation $d\lambda_{s\alpha}/dt = V_{s\alpha} - R_s I_{s\alpha} + \Delta_{s\alpha}$;
receiving a β-axis voltage $V_{s\beta}$ of the fixed coordinate system, the β-axis current $I_{s\beta}$ of the fixed coordinate system, and the β-axis flux error $\Delta_{s\beta}$ of the fixed coordinate system;
calculating a β-axis flux change ratio $d\lambda_{s\beta}/dt$ of the fixed coordinate system according to an equation $d\lambda_{s\beta}/dt = V_{s\beta} - R_s I_{s\beta} + \Delta_{s\beta}$;
integrating the calculated α axis flux change ratio to output the α axis flux $\lambda_{s\alpha}$ of the fixed coordinate system; and
integrating the calculated β axis flux change ratio to output the β axis flux $\lambda_{s\beta}$ of the fixed coordinate system.

9. The method according to claim 6, wherein calculating the fixed flux error comprises:
receiving a α-axis flux instruction value of the fixed coordinate system and α-axis flux;
receiving a β-axis flux instruction value of the fixed coordinate system and a β-axis flux;
calculating a first difference between the received α-axis flux instruction value the received α-axis flux;
calculating a second difference between the received β-axis flux instruction value and the received β-axis flux;
using the first difference to adjust a gain and calculate a α-axis flux error of the fixed coordinate system; and
using the second difference to adjust a gain and calculate a β-axis flux error of the fixed coordinate system.

10. The method according to claim 7, wherein the fixed flux instruction is calculated by using the calculated rotating flux to compensate for the rotation angle of the fixed coordinate system.

* * * * *